(12) United States Patent
Phillips et al.

(10) Patent No.: US 7,676,672 B2
(45) Date of Patent: Mar. 9, 2010

(54) ADMINISTRATIVE SECURITY SYSTEMS AND METHODS

(75) Inventors: Thomas G. Phillips, Bellevue, WA (US); Paul C. Sutton, Seattle, WA (US); Gang Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1363 days.

(21) Appl. No.: 11/106,851

(22) Filed: Apr. 15, 2005

(65) Prior Publication Data

US 2005/0182963 A1 Aug. 18, 2005

Related U.S. Application Data

(63) Continuation of application No. 10/872,888, filed on Jun. 21, 2004, now Pat. No. 6,922,784, which is a continuation of application No. 09/620,746, filed on Jul. 20, 2000, now Pat. No. 6,775,781.

(60) Provisional application No. 60/170,926, filed on Dec. 13, 1999, provisional application No. 60/176,370, filed on Jan. 14, 2000.

(51) Int. Cl.
*G06F 9/00* (2006.01)
(52) U.S. Cl. .................. 713/155; 713/161; 713/166
(58) Field of Classification Search ................. 713/155, 713/161, 166
See application file for complete search history.

(56) References Cited

U.S. PATENT DOCUMENTS

| 4,800,488 A | 1/1989 | Agrawal et al. |
| 5,222,242 A | 6/1993 | Choi et al. |
| 5,778,185 A | 7/1998 | Gregerson et al. |
| 5,793,968 A | 8/1998 | Gregerson et al. |

*Primary Examiner*—Thomas Peeso
(74) *Attorney, Agent, or Firm*—Lee & Hayes, PLLC

(57) ABSTRACT

In an implementation of administrative security systems and methods, access to administrative functions is controlled according to access privileges. A security process can be executed with administrative privilege to initiate an administrative function, and a user process can be executed with non-administrative privilege such that access to the administrative function is restricted. The user process can request initiation of the administrative function via the security process with parameters that include an identification of the administrative function and input arguments to the administrative function.

13 Claims, 5 Drawing Sheets

ADMINISTRATIVE SECURITY SYSTEMS AND METHODS

RELATED APPLICATIONS

This application is a continuation of and claims priority to U.S. patent application Ser. No. 10/872,888 entitled "Administrative Security Systems and Methods" filed Jun. 21, 2004 to Phillips et al., the disclosure of which is incorporated by reference herein.

U.S. patent application Ser. No. 10/872,888 is a continuation of and claims priority from U.S. patent application Ser. No. 09/620,746 issued Aug. 10, 2004 as U.S. Pat. No. 6,775,781, the disclosure of which is incorporated by reference herein.

U.S. patent application Ser. No. 09/620,746 claims priority from U.S. Provisional Application Ser. No. 60/170,926 filed Dec. 13, 1999, the disclosure of which is incorporated by reference herein.

U.S. patent application Ser. No. 09/620,746 also claims priority from U.S. Provisional Application Ser. No. 60/176,370 filed Jan. 14, 2000, the disclosure of which is incorporated by reference herein.

TECHNICAL FIELD

This invention relates to the administrative security of an operating system on a computing device.

BACKGROUND

A computer appliance or network appliance is a computing device that is similar in many respects to a general purpose computer. A computer appliance typically has many of the same components that a general purpose computer has such as one or more microprocessors, storage devices, memory, an operating system, and the like. Computer appliances are different, however, because they typically have a fixed function or purpose that does not or cannot vary. Specifically, computer appliances are designed and programmed to implement specific types of functionality.

Many different types of computer appliances are in use today. For example, a server appliance may be designed to implement functions that include file sharing, Internet sharing, print sharing, or some combination of these functions. As another example, a computer appliance may be implemented as a network attached storage device to store and maintain information. Other types of appliances include set top boxes that are used in connection with viewing multimedia presentations on a television, or hardware systems that are designed to control a home security system.

A frequent characteristic of computer appliances is that they do not rely on local user interaction mechanisms such as a display, a keyboard, and/or a mouse input. Computer appliance interaction is functionally different from a general purpose computer that typically does have a display, a keyboard, and a mouse input.

Computer appliances are generally designed to operate in conjunction with computing devices and with other computer appliances in a networked environment. Computer appliance software applications and operating systems are designed to be remotely accessible from a networked computing device so that the operational and administrative functions of a computer appliance can be accessed remotely.

The operational and administrative functions of a computer appliance may vary with the functionality and purpose of the appliance. Such functions include updating and deleting information stored on the computer appliance, formatting the storage media, and accessing a computer appliance's operating system facilities to administratively manage the appliance.

Because the functionalities of computer appliances can vary widely, so too can the adaptation requirements of the software applications and operating systems implemented for use on the appliances. Typically, the software applications for computer appliances are designed, adapted, and/or implemented by parties other than the computer hardware or operating system manufacturers. These parties are referred to herein as original equipment manufacturers (OEMs).

It is desirable that the software applications and operating systems be designed and/or configured to limit a user's access to only those operational and administrative functions of a computer appliance that the OEM intended a user to have access to. Accordingly, operating systems are designed with security in mind to limit a user's access to the operational and administrative functions of a computer appliance. However, the operating system is typically purchased from a software manufacturer and is not designed for the specific purpose being performed by the computer appliance. Accordingly, it is desirable for the operating system to be configurable by the OEM to control various aspects of computer operation.

FIG. 1 illustrates a conventional networked system 100. The system 100 has a network 110 that connects a network domain administrator 112, a client computer 114, multiple computer appliances 116, and a network attached storage device 118 which is a specific implementation of a computer appliance. The client computer 114 is a conventional general purpose computer, configured to serve as a data repository. The multiple computer appliances 116 are implemented to accommodate various functions within the networked system 100 and typically have many of the same components that the client computer 114 has such as one or more microprocessors, storage devices, memory, and an operating system.

Generally, the multiple computer appliances 116 and the network attached storage device 118 do not need to be implemented with user interaction mechanisms such as a display, a keyboard, and/or a mouse input because the devices are accessible via the network 110. The computer appliances 116 and 118 can be accessed by the client computer 114 via the network 110 utilizing well-known technologies such as Telnet and Hypertext Transport Protocol (HTTP).

The network attached storage device 118 is a networked computer appliance having a network interface card 120, volatile memory 122 such as read only memory (ROM) and random access memory (RAM), a mass storage medium 124 such as a hard disk drive, and a processor 126. The processor 126 executes an operating system 128.

In this example, the operating system 128 has a typical operating system security hierarchy 130. The security hierarchy 130 is depicted having a root node security level 132 that is intended to be accessed only by the computer appliance OEM or operating system manufacturer. The security hierarchy 130 has three other levels of security access to the operating system 128: a high security level 134, an intermediate security level 136, and a low security level 138. A user having access privileges to the operating system 128 at the high security level 134 would typically be able to administer and manage the computer appliance's network configuration parameters, delete files, allocate user accounts and access privilege levels to other users, and the like. A user having access privileges to the operating system 128 at the low security level 138 would typically only be able to read information stored on the computer appliance 118. A user having access privileges to the operating system 128 at the intermediate security level 136 would have access to the same aspects of the computer appliance 118 that the user having access to the low security level 138 would have, but the user having access to the intermediate security level 136 would not be able to access the high-level operational and administrative functions that a user having access to the high security level 134 would have.

Conventionally, access privileges to an operating system 128 are top-down, meaning that a user with a high access privilege level will have access to the operating system 128 at the high security level 134 and also at any level below the high security level (e.g., the user will also have access at the intermediate security level 136 and at the low security level 138). Similarly, a network domain administrator 112 typically has high access privilege rights to every computer and device joined to a network, thus having complete access to the network attached storage device 118. In addition, an "administrator" can log on to a client computer such as client computer 114, and thereby gain access to the administrative functionality of a computer appliance under a high security level 134.

FIG. 2 shows a prior art computer appliance 200 that employs a popular method of administrative control. Specifically, administrative control of the computer appliance 200 is performed through a client computer 202, which can comprise any network workstation having an HTML browser 204.

In this example, an administrative user interface 206 is implemented as a plurality of hyperlinked HTML documents 208. Many of these individual documents or pages comprise active content such as Active Server Pages (ASPs), Common Gateway Interface (GCI) or other Web server extensions. ASPs are a commonly used technology in the Internet and HTML environments.

The HTML-based user interface 206 is accessible to the administrative user through a normal HTML browser 204, i.e., different pages of the interface are "browsed" in a manner similar to that of browsing Internet content. The user begins at a login page where the user enters a user name and a password that are subsequently used to authenticate the user and to determine the user's privilege level.

Once the user is authenticated as having authority to perform administrative functions (e.g., methods) 212, the HTML-based user interface 206 presents pages that allow the user to perform such functions. The administrative functions 212 are carried out by making appropriate calls to the operating system 210.

One problem with this scheme results from the fact that the active content (e.g., HTML documents 208) executes under the authenticated user's security level. Because of this, the user must be given a privilege level that is high enough to perform all of the low-level administrative and configuration functions that might be performed by the active content 208. Granting this level of privileges, however, may make it possible for the user to tamper with system functionality in a way that might impair the functionality of the device or even render it inoperable.

A further complicating factor is that many operating systems provide only discrete levels of privileges. For example, the active content 208 may require privileges that are available only under an "administrative" privilege level. However, the "administrative" privilege level might also grant additional privileges that are not needed by the active content, and that the OEM might want to prevent end users from having access to. This is an undesirable situation, which the system described below alleviates.

SUMMARY

An administrative security process allocates operating system security based on a user's need to access discrete administrative tasks on a general purpose computing device or a computer appliance. This is favorable to giving a user complete access to the entire computing device or computer appliance, or to a partitioned security level of the operating system.

The administrative security process is a process that executes on a computer under its own administrative user account, having its own administrative privileges. The administrative security process then performs administrative functions on behalf of a user process that does not have an administrative access privilege level to the computer appliance.

The administrative security process acts as an intermediary between a user requesting an administrative action and the operating system. The security process can be used to provide or deny access to any aspect of the operating system for any particular user. The security process is a general purpose intermediary in that it is not coded with any information or knowledge of the operating system administrative functions that may be restricted to a user. Rather, this information is available in a data store that the security process accesses. Through this data store, the OEM can tailor security policies without having to modify portions of the operating system itself.

When the administrative security process receives a request from a user, the security process identifies three items of information: (1) the identity of the user making the request, (2) the area of the operating system being accessed (called the "class"), and (3) the type of change being requested (called the "method"). The identity of the user consists of the name of the user and the groups of which the user is a member. The later two items of information are treated as opaque items. That is, the security process does not interpret these items, other than through comparison with data in a data store. The administrative security process checks the three items of information against the data store to determine if a requested administrative method should be called.

The data store contains records, and each record consists of either a user identifier and a class, or a user identifier, a class, and a method. The user identifier can represent either a user or a group of users. The security process first looks for a record consisting of a user identifier, class, and method that match the user, class, and method being requested. If this record is found, the security process will allow the administrative function to continue. If the record is not found, the security process will look for a record comprising a user identifier and a class that match the user and class being requested. If found, the security process will allow the administrative function to continue. If neither of these records is found, the security process will not proceed with the administrative function.

The user identifier in the data store matches if it matches the user identifier of the user making the administrative request, or if it matches any of the groups that the user making the request is a member of. The class in the data store matches the class in the request if both are identical. The method in the data store matches the method in the request if both are identical.

If the administrative security process determines that the administrative function can proceed, it calls the class and method within the operating system on behalf of the requesting user process. The result of the administrative method is passed back to the requesting user process.

The administrative functions that each user is allowed to access are configured within the data store. The data store is restricted such that only the administrative security process and other authorized users can access and alter it. Through the use of a data store and a generic security process, the administrative functions that are permitted for each user can be modified without altering the code in the administrative security process.

BRIEF DESCRIPTION OF THE DRAWINGS

The same numbers are used throughout the drawings to reference like features and components.

DETAILED DESCRIPTION

Administrative security systems and methods is described mainly with computer appliance devices as examples. It should be apparent that the administrative security systems and methods are not limited to use in computer appliances, but may also be implemented in general purpose computers, operating systems, and computing devices.

Figure 1:
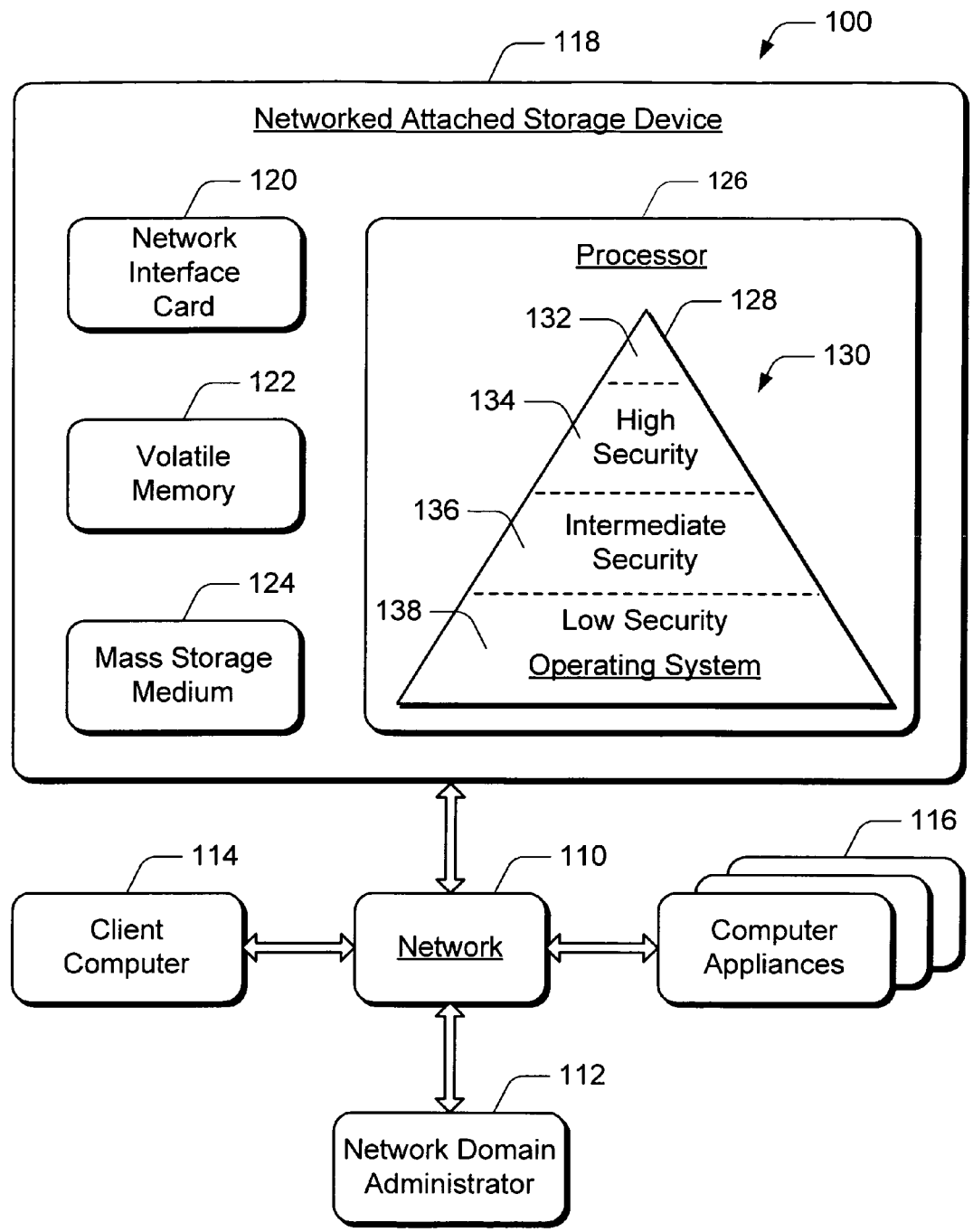
FIG. 1 is a block diagram that illustrates a conventional operating system security hierarchy in a computer appliance.
Figure 2:
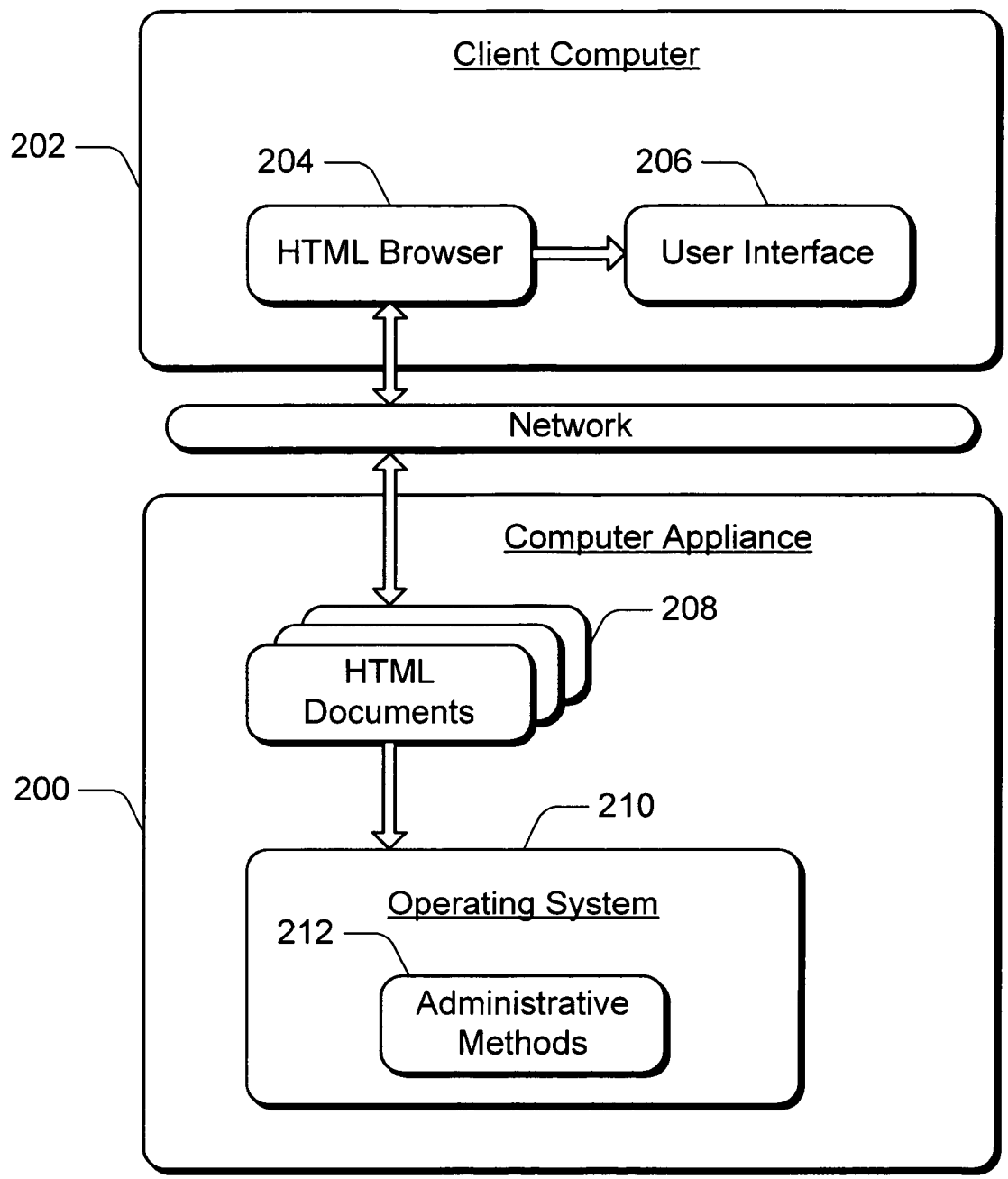
FIG. 2 is a block diagram that illustrates conventional administrative control for a computer appliance.
Figure 3:
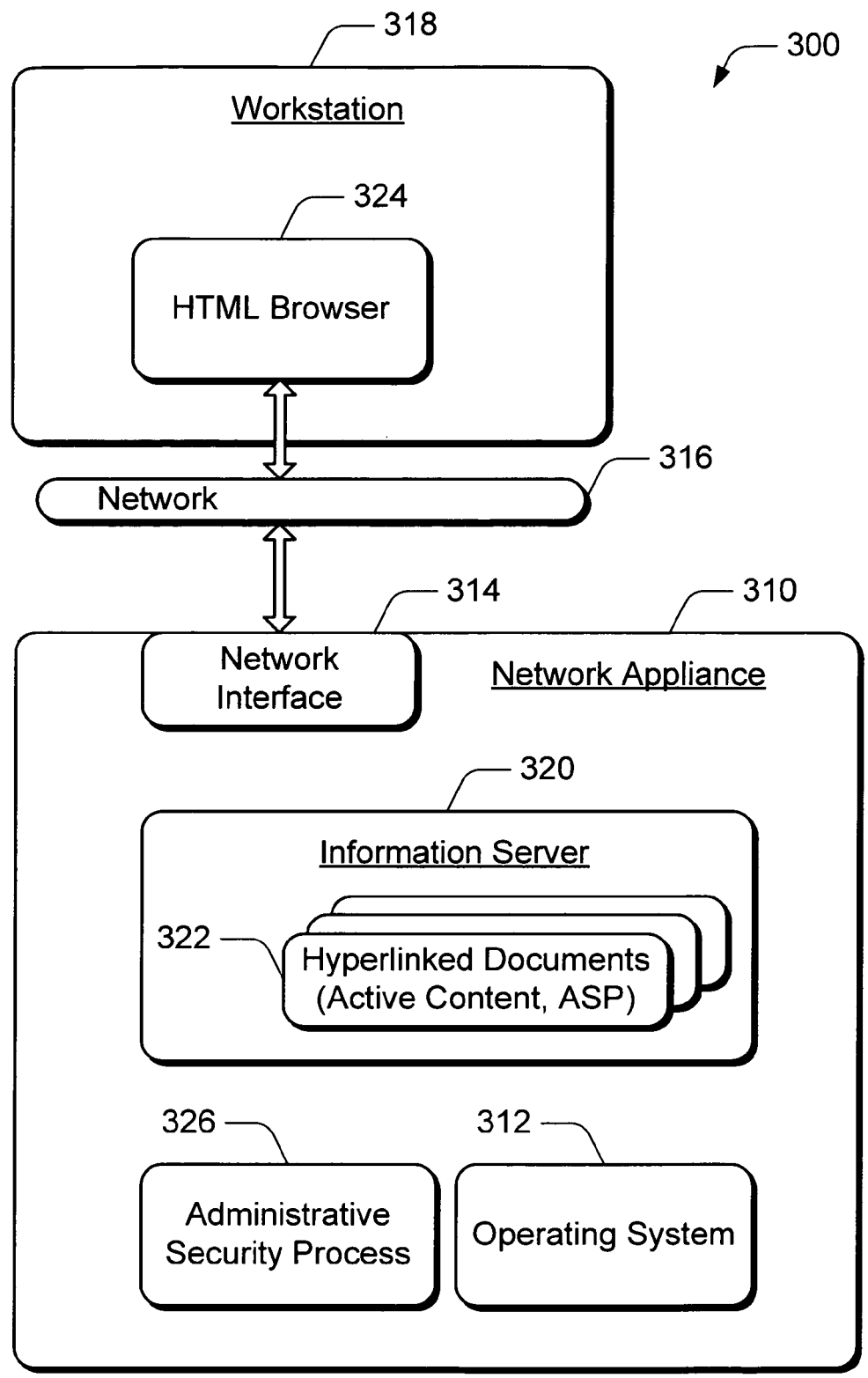
FIG. 3 is a block diagram that illustrates a network system and an administrative security process implemented on a network appliance.

FIG. 3 shows a network system 300 that includes a computer or network appliance 310. The network appliance is of a type that has a fixed function as determined by a manufacturer of the appliance. For example, the appliance 310 might comprise a storage server which is accessible by network clients for storing and retrieving data files. As another example, the appliance might comprise an Internet access device, through which network workstations can access the public Internet. There are many other examples of network appliances that might benefit from the invention: CD-ROM or DVD servers, email servers, network-based phone systems and voicemail systems, fax servers, and the like.

A frequent characteristic of a computer or network appliance is that it is pre-configured by its manufacturer for its intended function. In many cases, such as in the exemplary embodiment described below, the appliance comprises a PC-compatible computer running an off-the-shelf available operating system. In addition, the appliance typically has add-on hardware for performing tasks related to the functionality of the device such as interface cards, storage devices, communication devices, etc. Custom software applications are also usually pre-installed on the appliance. These application programs work with the operating system, standard PC hardware, and add-on hardware to provide the desired functionality.

The pre-configuration of the appliance by its manufacturer makes it very easy for an end user to set up the system for its intended environment. In most cases, however, the end user will still need to set a limited number of configuration parameters. This is typically done by an end-user administrator. This end-user administrator is not an "administrator" in the fullest or traditional sense because he or she is limited in the types of parameters that can be accessed and/or changed. Specifically, operating system environments define an "administrator" privilege level that allows a user to perform any available configuration activities. The end-user administrator, however, also referred to herein as a "power user," is allowed to perform only a subset of the available configuration activities.

Although the following description of an exemplary embodiment is set in the context of a network or computer appliance, there may be other situations in which the described administrative security process would be useful. Specifically, the administrative security process will be useful in any environment in which a user is to be limited to only a subset of the administrative functions that would otherwise be available to the user under an appropriate privilege level. This is applicable to any general purpose computer having multiple levels of administrative functionality. This will become more apparent as the discussion proceeds.

In the example illustrated in FIG. 3, the network appliance 310 includes an operating system 312 that limits access privileges of users in accordance with defined privilege levels. Generally available operating systems maintain user accounts for individual users. Each account has a name and a password that is known only to the user associated with the account. A user can log on to an account by supplying a user name and password at which point the operating system then considers the user to be authenticated under the user account.

User accounts are assigned to different groups maintained by the operating system, such as a "user" group, an "administrator" group, a "backup operator" group, etc. Different privilege levels can be assigned to each group. A user has privileges in accordance with the privilege levels assigned to any groups of which the user (or the user's account) is a member. Any processes initiated under the user's account have the same privileges as the user.

The network appliance 310 has a network interface 314 configured to communicate with network clients and to allow remote administration from such clients. In the illustrated example, the network appliance 310 is part of a local area network 316 through which it can communicate with other computers. One such computer is a remote client computer or workstation 318 which allows an end-user administrator to access and configure network appliance 310.

The network appliance 310 also includes an information server 320 and a plurality of hyperlinked documents 322 that form a user interface. The information server 320 serves the hyperlinked documents 322 to a requesting network client, such as workstation 318. Specifically, information server 320 responds to Hypertext Transport Protocol (HTTP) requests by providing information content such as Hypertext Markup Language (HTML) documents.

Workstation 318 has a hyperlink or HTML browser 324 that allows a user of the workstation to "browse" hyperlinked documents 322. In the illustrated embodiments, the hyperlinked documents 322 include active or executable content such as Active Server Pages (ASPs). ASPs combine HTML, scripts, and reusable ActiveX server components to create dynamically generated documents. When the HTML browser 324 requests an ASP document through information server 320, the information server executes any commands, scripts, or programs contained in the ASP document and sends a resulting HTML page to the HTML browser 324. In this example, the ASPs 322 potentially call the operating system 312 to set configuration parameters as indicated by the user through interaction with the hyperlinked documents 322.

By appropriately designing a cohesive set of hyperlinked documents, the manufacturer of a network appliance can provide an effective administration interface for an end-user administrator. The appliance can often be sold without a keyboard and display, since administration can be performed from any network workstation.

In addition to the components described above, the network appliance 310 includes an administrative security process 326. The security process 326 is a process that is configured in conjunction with the operating system to execute under its own user account. In this case, the administrative security process 326 is configured to run as a service under a user account having the "administrator" privilege level.

For example, such services are provided for in an operating system and can be installed by any user having a sufficient privilege level. Under an operating system, a system service such as the administrative security process 326 executes independently of whether any particular human user is actually logged on or authenticated. In practice, a user name and password for an administrative user account are provided during configuration of a system service, and the operating system then initiates the service upon each boot up-usually without any further input from a human user. Once installed, a service cannot be modified by users having lower privilege levels.

In operation, an end-user administrator uses HTML browser 324 to initially open a designated one of the hyperlinked documents 322. The active content underlying the hyperlinked documents interacts with the end-user administrator to authenticate the user on the network appliance 310. The user is authenticated under a particular user account, to which a particular privilege level has been assigned.

The network appliance 310 is configured so that end-user administrators are not allowed to have administrative privilege levels. Instead, the user accounts of end-user administrators are assigned to a "power users" group, having lower, non-administrative privilege levels. As will be described below, the administrative security process 326 can be configured to allow such "power users" to initiate certain administrative functions, beyond those which they would otherwise be able to initiate under their non-administrative privilege levels. This is possible because the security process 326 runs under a higher privilege level than the privilege level of the power users themselves.

Under the operating system, any processes (such as active content 322) initiated by a user will have only the privileges of that user. Thus, under the configuration described above, any ASPs or other active content have only a non-administrative user privilege level. The active content is therefore not allowed to directly perform certain administrative functions on the network appliance 310.

Instead, the active content 322 initiates a particular administrative function (that requires a higher privilege level than had by the current end-user administrator) by calling the administrative security process 326. The active content 322 calls the security process 326 with parameters that include an identification of a particular administrative method or procedure supported by the operating system, and arguments to be provided to the particular administrative method. In this context, the term "method" is used to indicate a callable software component such as a procedure, subroutine, function, etc.

In response to being called by the active content, the administrative security process (a) determines whether the requesting user process or client is allowed to initiate the particular administrative method, and (b) calls the particular administrative method on behalf of the user process, providing the arguments to the particular administrative method if the requesting user process is allowed to initiate the particular administrative method.

A requesting client is considered to be allowed or "authorized" to perform an administrative function if that client has been authenticated as belonging to the power users group, or has been otherwise designated as an individual user being authorized to initiate administrative methods. Thus, even though a power user does not possess administrative privileges from the viewpoint of the operating system, administrative functions can be requested via the administrative security process 326, which responds by calling administrative methods on behalf of the requesting power user. Different users or groups of users can be configured to have access to different sets of administrative functions. The use of "power user" or "power users" is an example of the mapping between a user, or user group, and a set of administrative functions. The specific label of a user or user group does not imply that the administrative security process only calls the administrative methods on behalf of one specific user or user group.

Generally, the administrative user account under which the administrative security process 326 executes has access to a plurality of administrative functions due to its high privilege level. However, the security process is configured to respond to requests only for a limited subset of the plurality of available administrative functions. Specifically, power users (users belonging to the power users group) are allowed to initiate only those administrative functions that are deemed necessary by the appliance manufacturer. The manufacturer is able to modify a list of users and user groups allowed to access each administrative function in order to customize the security scheme.

Figure 4:
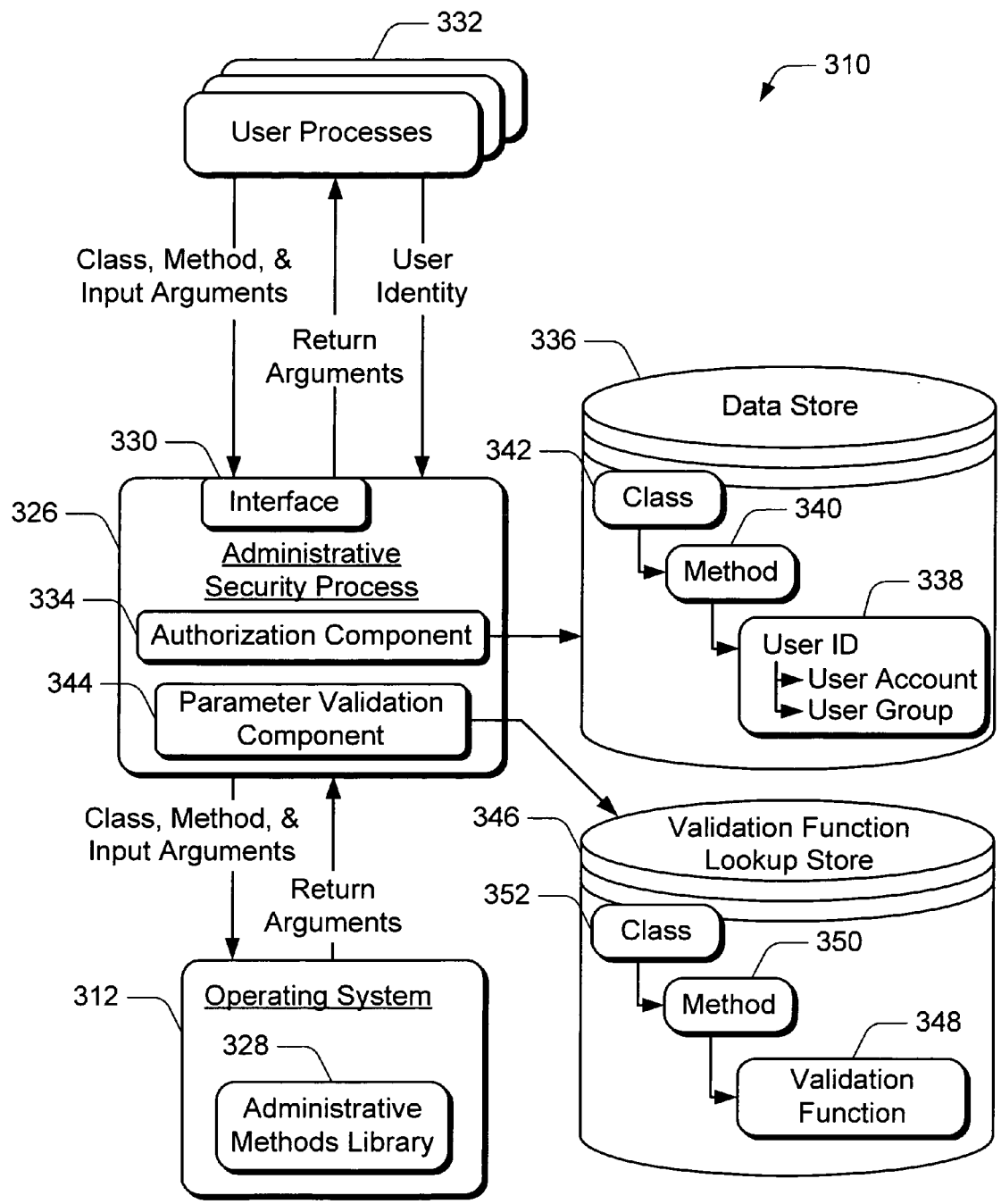
FIG. 4 is a block diagram that illustrates an administrative security process.

FIG. 4 shows some of the software components of computer or network appliance 310 in more detail. As already described, the appliance includes an administrative security process 326 and an operating system 312. The illustrated components reside in various forms of computer-readable memory such as addressable volatile read/write memory, non-volatile mass storage, and/or removable media such as floppy disks or CD-ROMs. The software components are executed by one or more processors (not shown).

The operating system 312 provides a plurality of privilege levels, which will be referred to herein as an "administrative" privilege level and "non-administrative" privilege levels. In practice, the operating system 312 might define a plurality of both administrative and non-administrative privilege levels. For purposes of this discussion, the non-administrative privilege levels have fewer privileges than the administrative privilege level. Furthermore, the labels "administrative" and "non-administrative" may or may not correspond to designations used within various operating systems to indicate different privilege levels.

Generally, it is assumed that an end-user administrator will need to perform functions that are permitted only under the administrative privilege level. Furthermore, it is assumed for purposes of this discussion that the administrative privilege level allows access to more administrative functionality than actually required by the end-user administrator.

The operating system 312 includes an operating system administrative methods library 328 which includes a defined set of administrative functions or methods that are callable by application programs to perform various administrative tasks. The operating system 312 allows application programs to call an administrative method only if the application program is running under a user account having a sufficient privilege level. An example of a function library 328 is the Windows® Management Instrumentation (WMI) interface which is available in Microsoft Windows®-based operating systems, as part of the "Win32" API. WMI functionality is implemented by operating system 312 in the form of a Component Object Model (COM) object: a software object with object interfaces and interface methods.

WMI provides an interface to a range of administrative functions encompassing the entire operating system, or any subset of the operating system, and to applications installed on the operating system. WMI is an object interface having a variety of methods 328. Such methods perform functions such as managing and facilitating the operation and administration of the network appliance 310. Specifically, available administrative functions include updating and deleting information stored on the network appliance 310, formatting and configuring the memory and storage media, accessing the operating system facilities, and the like. The interface methods allow individual functions to be performed only to the extent to which a requestor of those functions has a sufficient privilege level to initiate a particular administrative method.

The administrative security process 326 is configured to execute under an administrative user account belonging to the administrator user group, and having the administrative privilege level. This is possible because the operating system 312 grants administrative privileges to the security process 326 in accordance with the privilege level of its user account.

Administrative security process 326 can be implemented as a COM object having at least one object interface, referred to herein as an administrative security process interface 330. A user process 332 executing under the non-administrative privilege level initiates a particular one of the administrative methods 328 by calling the administrative security process 326 via the interface 330 with parameters that include the name of the administrative method, the class that the administrative method is associated with, and input arguments to be provided to the administrative method. In response to accepting a request from a user process 332 to initiate a particular administrative method 328, and after receiving the parameters, the administrative security process 326 invokes an authorization component 334.

The authorization component 334 references a data store 336 to determine whether the requesting user process 332 is allowed to initiate the particular one of the administrative methods 328. The data store 336 maintains records that include either (1) a user identifier 338, a method name 340, and a class 342 that the requested method is a part of, or (2) the user identifier 338 and the class 342. The user identifier 338 indicates either an operating system user account or an operating system user group.

To determine whether the requesting user process 332 is allowed to initiate the administrative method, the administrative security process 326 first looks to verify that the user identifier associated with the requesting process and the requested method and class name match a data store record having the same user identifier 338, method name 340, and class name 342. If the record is not found in the data store, the administrative security process 326 next looks to verify that the user identifier and associated method class match a data store record having the same user identifier 338 and class name 342.

The administrative security process 326 can also invoke a parameter validation component to reference a validation function lookup store 346, to validate the input arguments for the requested administrative method 328. The validation function lookup store 346 designates different parameter validation functions for different administrative methods. The validation function lookup store 346 does so with records that include a designated parameter validation function 348, a method name 350, and the method's class identifier 352.

To validate the input arguments for a requested administrative method, the administrative security process 326 looks to match the requested method and associated class with a record having the same method name 350 and class 352 in the validation function lookup store 346. If the record is found, the security process 326 calls the designated parameter validation function 348 to validate the arguments to be provided to the requested administrative method.

The parameter validation function 348 is called to validate the method input arguments. The function for a particular method limits the access to the method based on the input arguments. If the input arguments are not validated by the parameter validation function 348, the function returns a "false" to the administrative security process 326 to indicate that the requested administrative method should not be called. If the input arguments are validated, the validation function returns a "true" to indicate that the requested administrative method can be called.

If the administrative security process 326 determines that the user process 332 is allowed to initiate a particular administrative method 328, the security process 326 calls the class and particular method within the operating system on behalf of the requesting user process. The security process 326 also provides the input arguments from the requesting user process to the particular administrative method. After calling the particular administrative method, the security process 326 receives any return arguments from the administrative method and passes the return arguments back to the requesting user process.

In this example, the administrative security process 326 is abstracted from the method being requested, and calls the method without having to understand what the user is requesting. Specifically, a user process can request any class and method available on the computer, whether or not the security process has any pre-programmed knowledge of the class and method. The security process can call the specified method because the class identifier specifies the location of the object supporting the method and because the requesting process has provided all necessary arguments for the method.

Because of the unique implementation, a manufacturer of a network appliance can specify a defined set of administrative functions that will be accessible by any particular user or group of users. The operating system itself does not need to be pre-configured for any certain type of security scheme, or for any type of parameter verification. Apart from the operating system, both the data store 336 and the validation function lookup store 346 are configured by the OEM, the operating system manufacturer, or both. Validation lookup functions themselves are also provided by the OEM.

The ability to request an arbitrary method by specifying its class identifier, method name, and parameters is a desirable feature in most situations. However, it might be desirable in some situations to implement certain administrative functionality in the administrative security process itself. Specifically, the security process might have its own library of methods that are callable from user processes to perform administrative tasks without necessarily passing the arguments directly to an operating system method.

Figure 5:
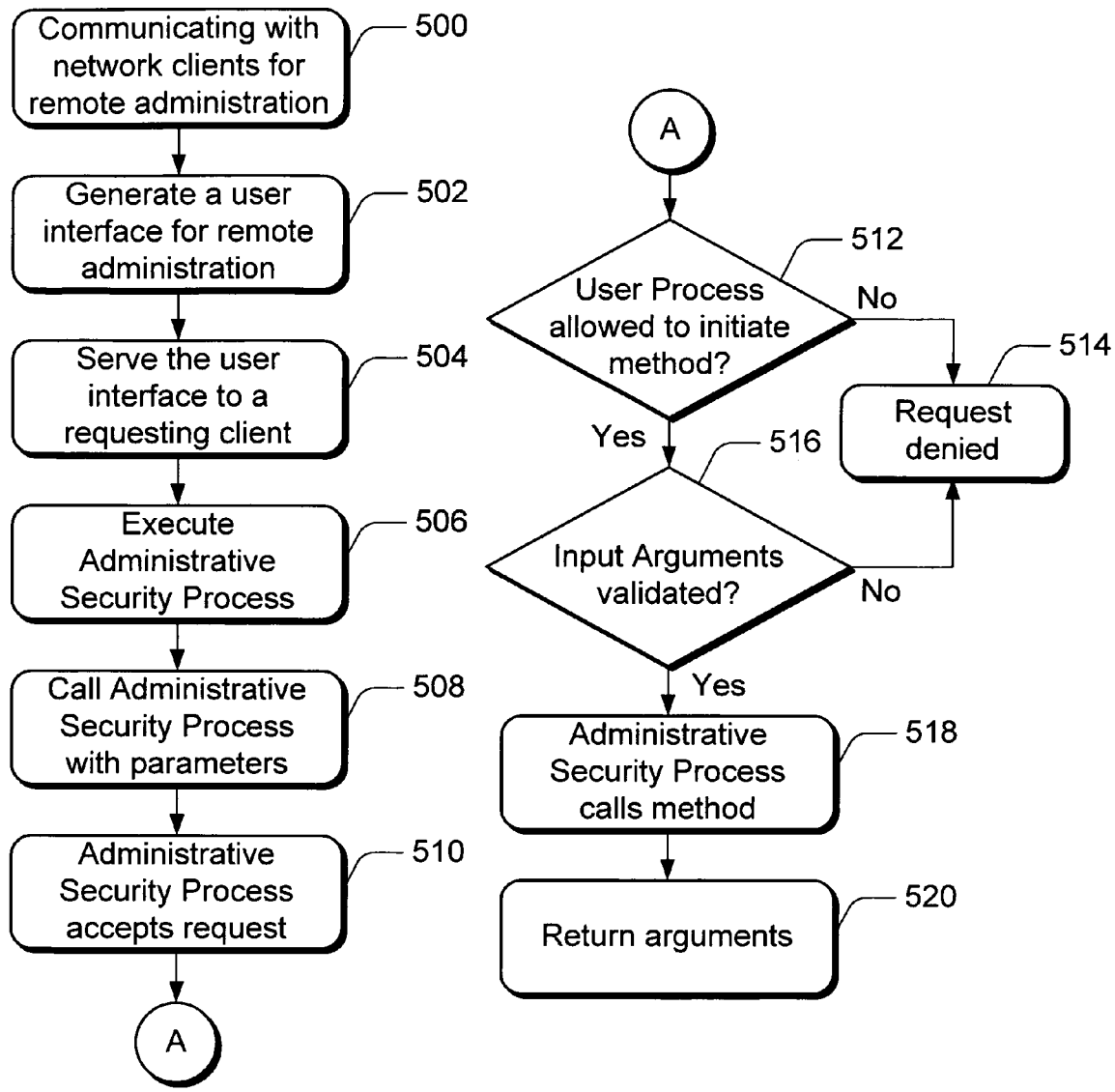
FIG. 5 is a flow diagram that describes acts in a method for allowing the administration of a network appliance.

FIG. 5 illustrates acts carried out in a method implemented by a networked system having an administrative security process as described above to allow administration of a network appliance or other computer system. An act 500 comprises communicating with network clients to facilitate remote administration of the network appliance from one or more of the network clients. An act 502 comprises generating a user interface for remote administration from a plurality of hyperlinked documents. The hyperlinked documents include executable content running as a user process that executes under a non-administrative privilege level of a requesting network client. An act 504 comprises serving the user interface to the requesting network client.

An act 506 comprises executing an administrative security process under an administrative privilege level. Specifically, this act comprises executing an administrative security process as a service under a user account having an administrative privilege level. To request that a particular administrative method be initiated, an act 508 performed by the user process comprises calling the administrative security process with parameters comprising (a) an identification of the particular administrative method (the name of the method) and (b) arguments to be provided to the particular administrative method.

An act 510 comprises the administrative security process accepting the request from the user process executing under a non-administrative privilege level to initiate a particular administrative method. As described above, the requesting user process executes under the non-administrative privilege level, and is therefore unable to directly perform the requested function. An act 512 comprises the administrative security process determining whether the user process is allowed to initiate the particular administrative method by referencing a data store to verify that the user process is executing under an operating system user account, or executing under an operating system user account belonging to a user group, that has been designated as being allowed to initiate the particular administrative method. If the user process is not allowed to initiate the particular administrative method, the administrative security process does not call the administrative method (at 514).

If the user process is allowed to initiate the particular administrative method, an act 516 comprises the administrative security process referencing a validation function lookup store to identify and call a designated parameter validation function to validate the arguments that are to be provided to the particular administrative method. If the arguments are not validated, the security process does not call the administrative method (at 514).

If the user process is allowed to initiate the particular administrative method, and if the input arguments are validated, an act 518 comprises the administrative security process calling the particular administrative method on behalf of the user process and providing the arguments to the particular administrative method. The particular administrative method returns one or more arguments to the administrative security process which subsequently passes the return arguments to the requesting user process (at 520).

The system and administrative security process described herein allows a manufacturer of a computer, such as a network appliance, a way in which to provide a secure administrative interface for an end-user administrator of the appliance. The administrative security process allows an end user to initiate administrative functions that would not otherwise be available under an end user's non-administrative privilege level. This is possible because the security process executes under an administrative privilege level. Even though an end-user administrator does not possess administrative privileges from the viewpoint of the operating system, administrative functions can be requested via the administrative security process, which responds by initiating the functions on behalf of the user.

Furthermore, the system allows an OEM to uniquely tailor an operating system based computer for the particular needs of the OEM. This can be accomplished without any modifications to the operating system itself. An additional benefit is that methods provided apart from the operating system (such as by third parties or the OEM itself) can be supported and called through the administrative security process, again without any need for the operating system manufacturer to specifically provide for the method.

Although embodiments of administrative security systems and methods have been described in language specific to structural features and/or methods, it is to be understood that the subject of the appended claims is not necessarily limited to the specific features or methods described. Rather, the specific features and methods are disclosed as exemplary implementations of administrative security systems and methods.

The invention claimed is:

1. A computing device, comprising:
   means for controlling access to administrative functions according to access privileges;
   means for executing a security process with administrative privilege to initiate an administrative function;
   means for executing a user process with non-administrative privilege restricting access to the administrative function; and
   means for requesting initiation of the administrative function via the security process on behalf of the user process with parameters that include an identification of the administrative function and input arguments to the administrative function.

2. A computing device as recited in claim 1, further comprising means for initiating the administrative function with the input arguments on behalf of the user process.

3. A computing device as recited in claim 1, further comprising means for determining whether the user process is allowed to initiate the administrative function via the security process.

4. A computing device as recited in claim 1, further comprising:
   means for determining whether the user process is allowed to initiate the administrative function via the security process; and
   means for initiating the administrative function with the input arguments on behalf of the user process if determining that the user process is allowed to initiate the administrative function via the security process.

5. A computing device as recited in claim 1, further comprising means for determining whether the input arguments for the administrative function are valid.

6. A computing device as recited in claim 1, further comprising:
   means for determining whether the input arguments for the administrative function are valid; and
   means for initiating the administrative function with the input arguments on behalf of the user process if the input arguments for the administrative function are determined to be valid.

7. A computing device as recited in claim 1, further comprising:
   means for determining whether the user process is allowed to initiate the administrative function via the security process;
   means for determining whether the input arguments for the administrative function are valid; and
   means for initiating the administrative function with the input arguments on behalf of the user process if the input arguments for the administrative function are determined to be valid, and if determining that the user process is allowed to initiate the administrative function via the security process.

8. A computing device as recited in claim 1, further comprising means for instantiating the user process to execute with the non-administrative privilege via remote administration from a networked remote administrator.

9. A computing device as recited in claim 1, wherein the means for controlling access to the administrative function includes means for controlling access to the administrative functions of an operating system.

10. A computing device as recited in claim 1, wherein the means for controlling access to the administrative functions includes means for controlling access to the administrative functions of the security process.

11. A computing device as recited in claim 1, wherein the means for executing the security process includes means for executing the security process as an independent user service with the administrative privilege.

12. A computing device as recited in claim 1, further comprising means for configuring the security process as an intermediary between the user process and the administrative function such that the security process is independent of administrative function implementation.

13. A computing device as recited in claim 1, further comprising means for receiving the parameters and initiating the administrative function with the input arguments on behalf of the user process such that the security process is independent of administrative function execution.

* * * * *